(12) United States Patent
Lau

(10) Patent No.: US 7,641,355 B2
(45) Date of Patent: Jan. 5, 2010

(54) DECORATIVE LIGHT DEVICES

(76) Inventor: Kam Cham Lau, 2434-14th Ave., San Francisco, CA (US) 94116

( * ) Notice: Subject to any disclaimer, the term of this patent is extended or adjusted under 35 U.S.C. 154(b) by 30 days.

(21) Appl. No.: 11/897,764

(22) Filed: Sep. 4, 2007

(65) Prior Publication Data

US 2009/0059578 A1    Mar. 5, 2009

(51) Int. Cl.
*F21S 6/00*    (2006.01)
(52) U.S. Cl. .............. 362/123; 362/231; 362/252; 362/806; 362/800; 428/18; 428/19; 428/20
(58) Field of Classification Search ............ 362/123, 362/800, 806, 568, 231, 252; 428/18, 19, 428/20
See application file for complete search history.

(56) References Cited

U.S. PATENT DOCUMENTS 4,364,102 A * 12/1982 Huppert et al. ............ 362/123
5,115,921 A * 5/1992 Lavelle .................... 211/85.15
7,163,725 B2 * 1/2007 Johnson et al. ............... 428/20

* cited by examiner

*Primary Examiner*—Sandra L O'Shea
*Assistant Examiner*—Jessica L McMillan
(74) *Attorney, Agent, or Firm*—David W. Wong

(57) ABSTRACT

The decorative light device has a stylized shape of a Christmas tree, or a snow flake. It comprises a transparent or translucent solid plastic member having an elongated solid plastic main body and a plurality of side branches extending outward therefrom at an angle at a plurality of junctions. A light refraction opening is formed at the main body and located adjacent to each one of those junctions. An LED light source is located at a bottom end of the main body and is operative to provide a single or a series of flashing lights of various sequential colors for illuminating the main body and the side branches. A stylized snow flake can be made with a plurality of these solid plastic members mounted in an evenly spaced manner around the periphery of a center mounting member.

20 Claims, 5 Drawing Sheets

DECORATIVE LIGHT DEVICES

BACKGROUND OF THE INVENTION

1. Field of the Invention

This invention relates to decorative light devices and more particularly light devices suitable for festive decoration such as at Christmas time.

2. Background Art

Electrical light devices are commonly used for decoration purposes such as in Christmas. A plurality of lights such as colored lights and/or flashing lights are attached to Christmas trees and other ornaments in order to accentuate the decorative effect of such displays. The lights may be provided by fluorescent or LED light bulbs mounted to the ornaments. Due to that a large amount of electrical connection wiring and lights that are required for such lighted displays, they are very costly and time consuming to erect. Also, the numerous electrical connections are inherently prone to damage causing the entire light device to malfunction. Furthermore, when problems occur with one or some of the wiring and/or lights it is very difficult to repair and to replace the problematic wiring and/or lights. The decoration is also costly to operate particularly for fluorescent lights due to the relatively high electrical consumption by the large number of such light devices employed.

Some decorations utilize a plurality of elongated optic fibers bundled together and a light source is provided at one end of the bundle. The light is conducted through all the optic fibers to display it at all the free ends of the optic fibers as a plurality of light spots. The lighting effect of such decorations is rather limited. Also, such construction can not be utilized for accentuating the entirety of the actual ornaments such as a Christmas tree, and simulated snow flakes, and stars etc.

SUMMARY OF THE INVENTION

It is a principal object of the present invention to provide decorative light devices which simulate various lighted ornaments.

It is another object of the present invention to provide light devices which display light through the entirety of the ornament.

It is another object of the present invention to provide light devices having lighted shapes of various ornaments.

It is still another object of the present invention to provide decorative light devices having simple construction and are easy to fabricate and erect.

It is yet another object of the present invention to provide decorative light devices which provides a plurality of light display areas from a single light source or a plurality of light sources selectively.

BRIEF DESCRIPTION OF THE DRAWINGS

The present invention will now be described in more detail, by way of example only, with reference to the accompanying drawings, in which.

DETAILED DESCRIPTION OF THE PREFERRED EMBODIMENTS

Figure 1:
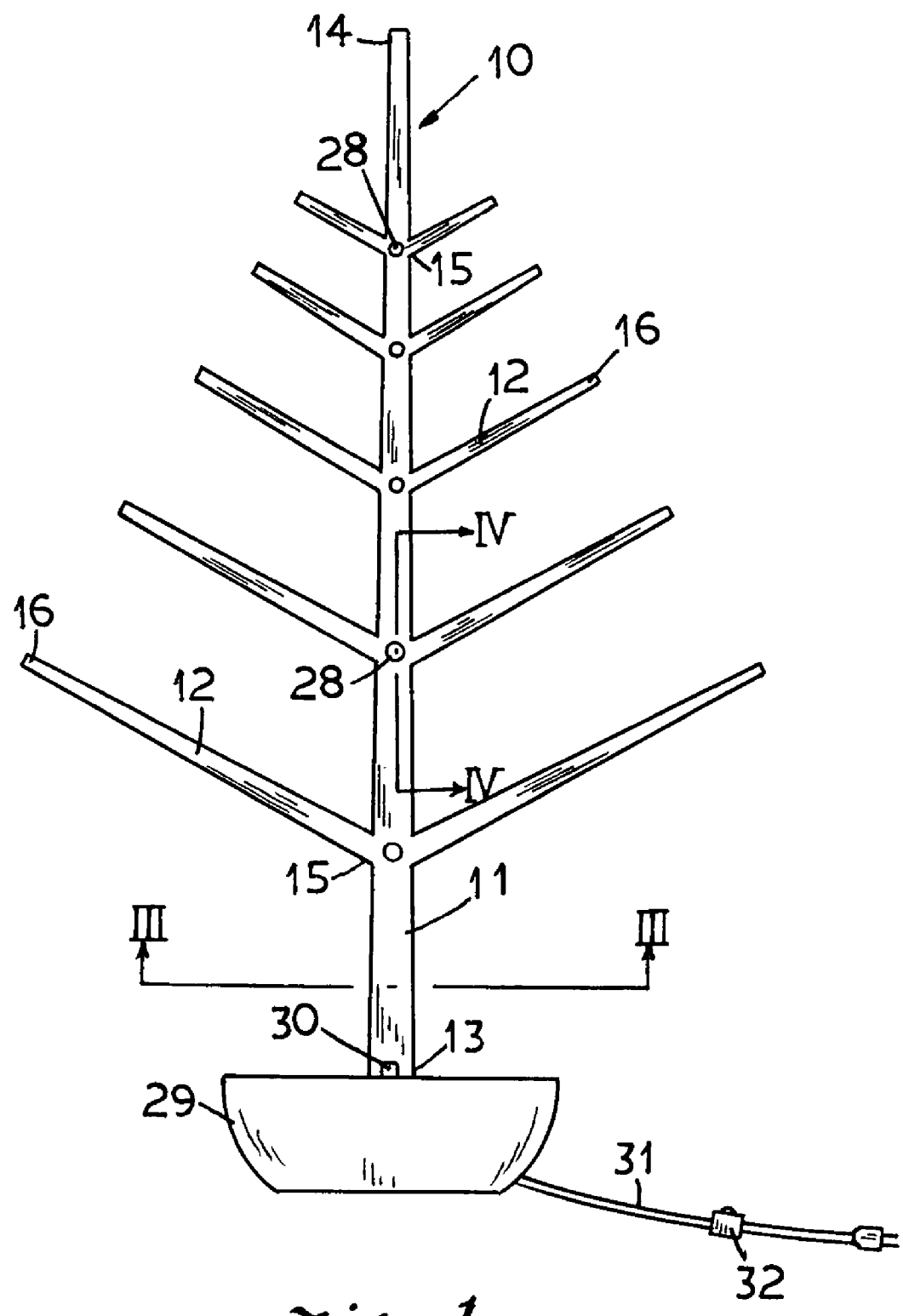
FIG. 1 is a perspective front elevation view of a simulated Christmas tree having the lighting means provided therein according to the present invention.
Figure 2A:
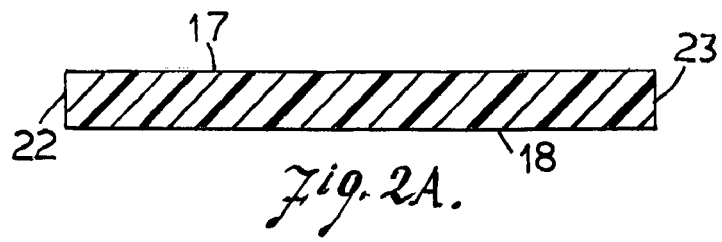
FIGS. 2A, 2B, 2C and 2D are enlarged cross sectional elevation view along section line II-II of FIG. 1 showing various alternative cross sectional shape of the solid plastic main trunk and branches of the simulated Christmas tree.
Figure 2B:
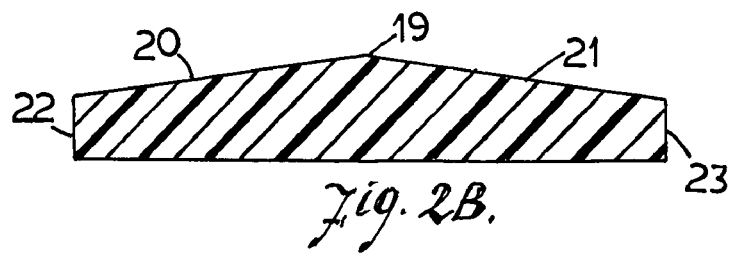
Figure 2C:
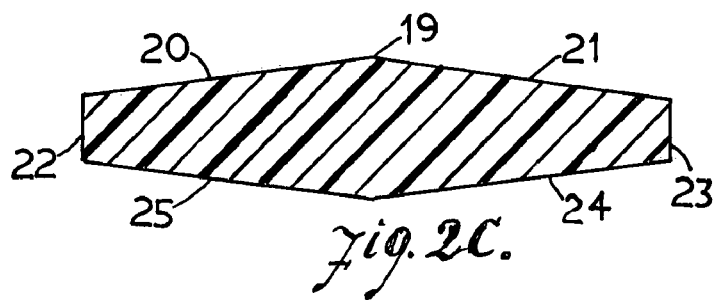
Figure 2D:
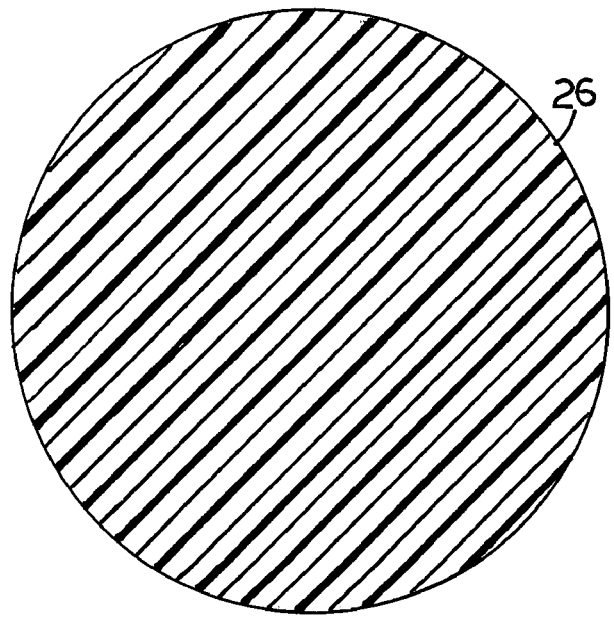

With reference to the drawings, the light device 10 according to the present invention has an elongated solid plastic main body 11 and a plurality of solid plastic side arms or branches 12 extending outward sideways at an angle at a plurality of junctions along the entire longitudinal length of the main body 11. A single device 10 may be employed to form a simulated stylized Christmas tree as shown in FIG. 1, with the solid plastic main body 11 forming the main trunk and the solid plastic side arms or branches 12 forming the plurality of side branches of the Christmas tree. The light device 10 may be made by molding with a light conducting transparent or translucent plastic material such as acrylic. The main body 11 and the side arms or branches 12 may be integrally formed. The main body 11 is preferably larger in size at the bottom portion 13 and tapering upwards to a smaller top portion 14 so as to simulate a genuine Christmas tree. The side arms or branches 12 also preferably extend outwards from a larger inner portion 15 attaching to the main body 11 to a smaller outer free end portion 16. The main body 11 and the side arms or branches 12 may have alternative cross sectional shapes such as a solid rectangular shape as shown in FIG. 2A with a flat front surface 17 and a flat rear surface 18; a solid pentagonal shape as shown in FIG. 2B with a longitudinal linear ridge 19 and two sloping front surfaces 20 and 21 sloping rearward towards the lateral sides 22 and 23 respectively; a solid hexagonal shape as shown in FIG. 2C with a rear surface having a similar shape as the front surface with two sloping surfaces 24 and 25 sloping forward towards the lateral sides 22 and 23 respectively; or a solid circular shape 26 as shown in FIG. 2D. For convenience of illustration, a solid pentagonal shape is shown in the exemplary embodiment.

Figure 3:
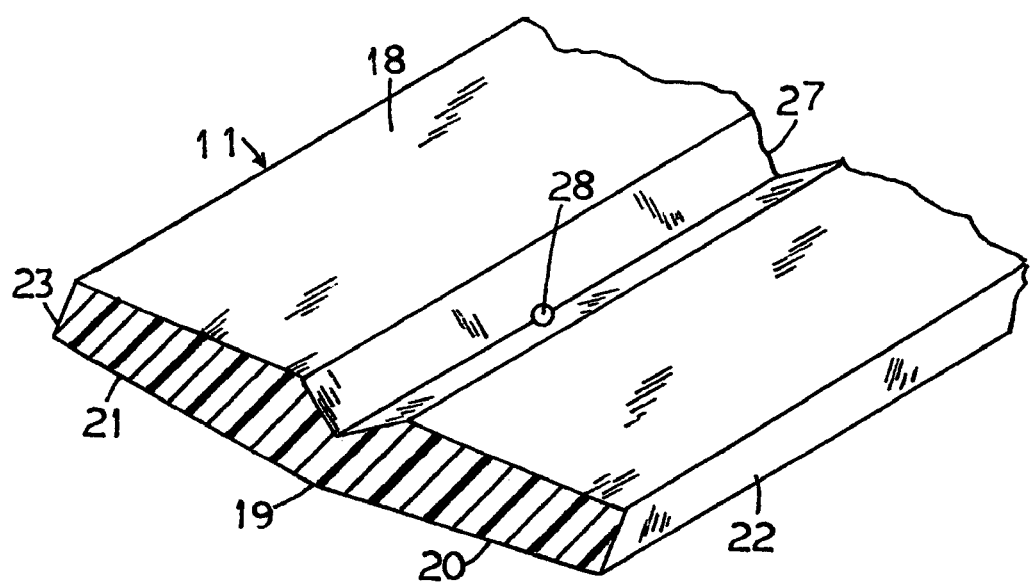
FIG. 3 is an isolated enlarged partial sectional bottom elevation view of the solid plastic main trunk and the branches showing the formation of a channel in the bottom surface therein.
Figure 4:
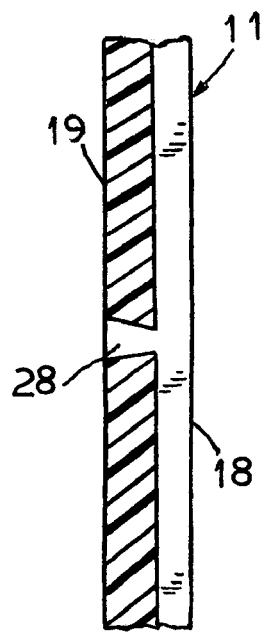
FIG. 4 is an enlarged cross sectional elevation view along section line IV-IV of FIG. 1.

A groove 27 having a V-shaped cross section shape as shown in FIG. 3 is preferably formed along the entire central longitudinal length of the rear surface 18 of both the main body 11 and the side arms or branches 12. A light refraction opening 28 is formed in the main body 11 at each junction with each one of the side arms or branches 12 as best shown in FIG. 1.

The main body 11 is mounted in a vertical manner on a support such as a supporting container 29 simulating a planter pot. A light source 30 such as an LED light is located juxtaposed to the bottom end of the main body 11. The LED light may be powered with battery power supply located in the container 29 or alternatively with an AC power through power supply cord 31 having a through cord power switch 32.

When the LED light is actuated, the light generated will travel inside along the solid plastic main body 11 upwards to illuminate the latter. The light will also impinge upon the side wall of each light refraction opening 28 to refract outward therefrom to form a light spot so as to provide a secondary light source at each opening 28. The light at the secondary light source at each light refraction opening 28 will travel along each solid plastic side arm or branch 12 to illuminate the latter. The refracted light from the sloping side walls of the V-shaped groove 27 also enhance the lighting effect of both the main body 11 and the side arms or branches 12.

The LED light may also be operated to provide flashing light of a single color or a series of sequential lights of multi-colors so as to accentuate the decorative effect of the Christmas tree.

Figure 5:
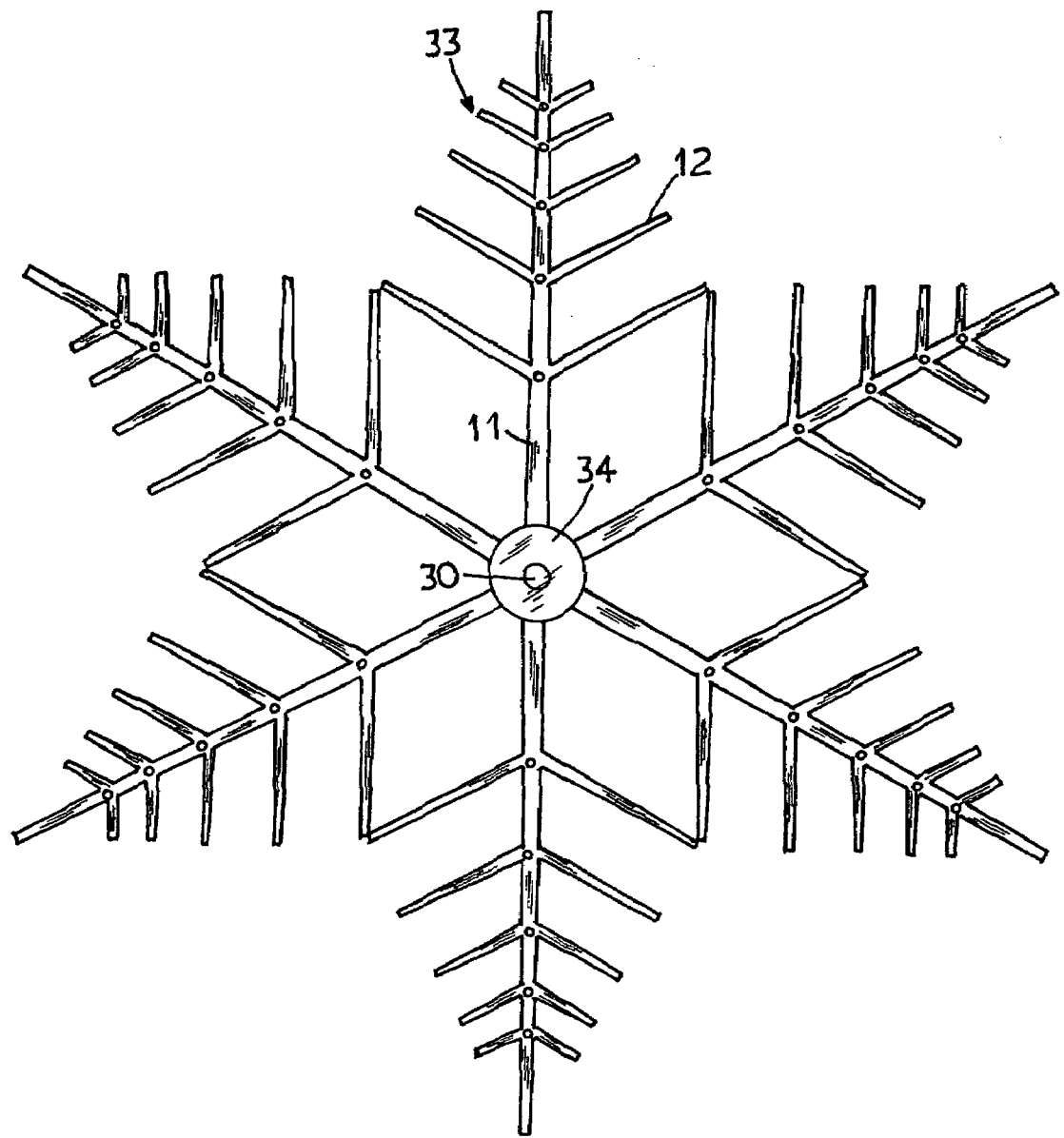
FIG. 5 is a perspective front elevation view of a simulated snow flake having a plurality of solid plastic branches according to the present invention.

A simulated lighted snow flake 33 may be formed with a plurality of the light device 10 of the present invention. As shown in FIG. 5, six light device 10 are mounted evenly spaced on a center mount 34. The LED light of the light source 30 is mounted at the center of the center mount 34 to provide the flashing light or multi-color lights for illuminating the snow flake 33. Alternatively, a plurality of LED lights may be provided in the center mount 34 with each LED therein located adjacent to the inner end of each main body 10 so as to provide a brighter lighting effect of the snow flake. Each of the plurality of LED lights may also be activated separately to emit sequence of various color lights such that a kaleidoscope of color lights will be displayed by the snow flake 33.

Figure 6:
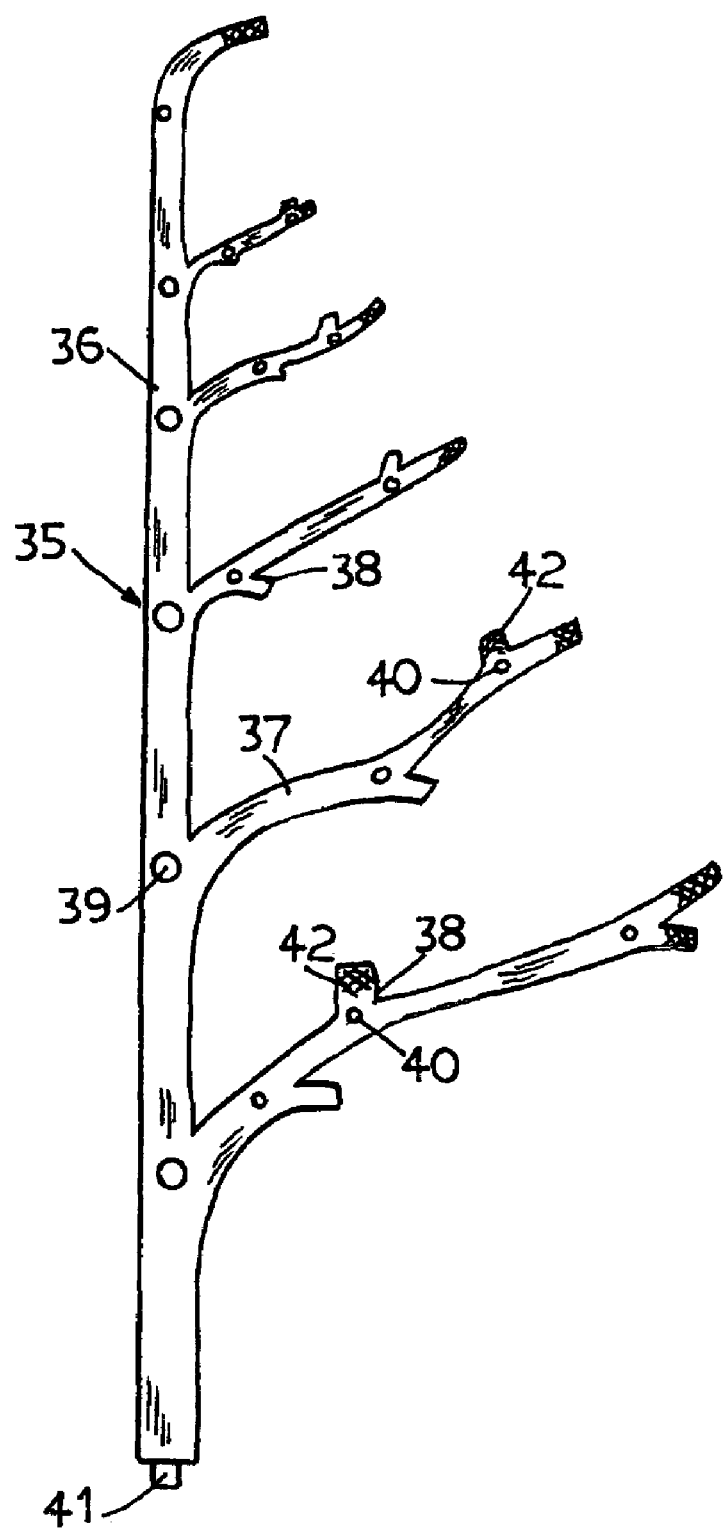
FIG. 6 is a perspective front elevation view of a half portion of a simulated lighted Christmas tree according to the present invention.

A half portion of another stylized Christmas tree 35 as shown in FIG. 6 may be formed according to the present invention. The solid plastic main trunk 36 and the solid plastic side branches 37 have rounded cross sectional shape to provide a more simulated realistic form of a Christmas tree. Additional secondary branches or knots 38 are formed on the side branches 37. Similar to the above embodiment, a light refraction opening 39 is formed in the main trunk 36 at the junction with each side branch and a secondary light refraction opening 40 is formed at the side branches at each junction with the secondary branch or knot 38. The light refraction openings 39 and secondary light refraction opening 40 may be through openings or blind-ended openings having a conical side wall. The LED light source 41 is located adjacent to the lower end of the main trunk 36. The external surface 41 of the end portion of selected knots 38 and end portion of the side branches 37 may be roughened by polishing. When the Christmas tree of this embodiment is lighted by the LED light source, the solid plastic main trunk 36 will become illuminated by the LED light source, and the openings 39 will also be illuminated to provide an individual light source for providing illumination for the side branches 37. In similar manner, the secondary light refraction openings 40 will also be illuminated to provide individual light sources for illuminating the secondary branches or knots 38. The light will be scattered at the knots or end portion of the side branches having a polished external surface to provide light diffused portions 42 of the Christmas tree. Similar to the above embodiment, the LED light or lights at the center mount 34 may be energized with AC power supply connected to the center mount 34 or with button batteries and the electronic control circuit incorporated in the center mount. The latter construction is particularly preferred for relatively smaller size stylized snow flakes.

A single lighted snow flake or a plurality of snow flakes of various sizes according to the present invention may be mounted on a wall to provide the desirable festive decoration. The light illumination not only is transmitted through the transparent or translucent plastic material to light up the snow flake but also shining on the area of the wall around the snow flake to provide a flashing light display. It can be appreciated that the light device of the present invention is simple to erect and operate.

Various modifications can be made without departing from the spirit of this invention or the scope of the appended claims. The embodiments set forth in this disclosure are given as examples and are in no way final or binding. In view of the above, it will be seen that several objects of the invention are achieved and other advantages are obtained. As many changes could be made in the above construction and methods with departing from the scope of the invention, it is intended that all matter contained in the above description shall be interpreted as illustrative and not in a limiting sense.

What is claimed is:

1. A decorative light device comprising,
   an elongated solid plastic main body having a plurality of solid plastic side branches extending outward at an angle at a plurality of junctions along the entire longitudinal length therefrom, said main body and said side branches being made of a light transmitting plastic material,
   a light refraction opening formed in said solid plastic main body and located adjacent to each one of said junctions,
   an LED light source located adjacent a bottom end of said main body, said LED light being operative to provide light for illuminating said light device.

2. A decorative light device according to claim 1 wherein said opening is a through opening extending from a front surface through to a rear surface of said solid plastic main body.

3. A decorative light device according to claim 2 wherein said LED light source is operative to provide a sequential series of light of a plurality of colors.

4. A decorative light device according to claim 2 wherein said LED light source is operative to provide flashing light for illuminating said light device.

5. A decorative light device according to claim 2 wherein said main body and said side branches have a pentagonal cross sectional shape with a front surface having a longitudinal ridge and two sloping side surfaces sloping downward from said longitudinal ridge.

6. A decorative light device according to claim 5 including a cross sectional V-shaped groove formed at a central longitudinal portion of a rear surface of said main body.

7. A decorative light device according to claim 6 including a secondary cross sectional V-shaped groove formed at a central longitudinal portion of a rear surface of each one of said side branches.

8. A decorative light device according to claim 7 wherein said main body has a larger bottom end tapering to a smaller top end and said side branches have a larger inner end tapering to a smaller outer free end.

9. A decorative light device according to claim 8 wherein said main body is extending at an upright manner with said bottom end secured to a support and said LED light source is located in said support.

10. A decorative light device according to claim 2 wherein said main body and said side branches have a generally hexagonal cross sectional shape with both front surface and bottom surface therein having a longitudinal ridge and two sloping side surfaces sloping downward from said longitudinal ridge.

11. A decorative light device according to claim 1 wherein said main body and said side branches have a rectangular cross sectional shape.

12. A decorative light device according to claim 1 wherein said main body and said side branches have a generally circular cross sectional shape.

13. A decorative light device comprising:
   a plurality of transparent solid plastic members having an elongated solid plastic main body and a plurality of solid plastic side branches extending outward at an angle from said main body at a plurality of junctions along the entire longitudinal length of said main body, said plastic members extending outward in an evenly spaced manner around periphery of a center mounting member with a bottom end of said main body mounted to said center mounting member, a light refraction opening formed in said main body and located immediately adjacent to each one of said junctions, an LED light source located in said center mounting member and being operative to provide light traveling inside said solid plastic members for illuminating said main body and said side branches.

14. A decorative light device according to claim 13 including a V-shaped cross sectional shape groove formed along an entire central longitudinal length of a rear surface of said main body, and a secondary V-shaped cross sectional shape groove formed along an entire central longitudinal length of a bottom surface of said side branches and said main body and side branches being integrally formed in a molding process.

15. A decorative light device according to claim 14 wherein said LED light source is operative to provide a flashing light.

16. A decorative light device according to claim 15 wherein said light device has a stylized shape of a snow flake, and said main body and said side branches are integrally formed in a molding process.

17. A decorative light device according to claim 16 wherein selected free ends of said secondary side branches have a polished surface for displaying a diffused light therefrom.

18. A decorative light device according to claim 14 wherein said LED light source is operative to provide a series of lights having a plurality of sequential colors.

19. A decorative light device according to claim 18 including an LED light located adjacent to said bottom end of each one of said plastic members.

20. A decorative light device in a stylized form of a tree comprising, a solid plastic member having an elongated solid plastic main body extending in an upright manner from a support means, a plurality of side branches extending outward at a plurality of junctions and at an angle along the entire longitudinal length of said main body, said main body and said side branches being made of a light transmission plastic material, a plurality of solid plastic secondary side branches extending outward at an angle at secondary junctions along the longitudinal length of said side branches, a light refraction opening formed in said main body and located adjacent to each one of said junctions, and a secondary light refraction opening formed in said side branches and located adjacent to each one of said secondary junctions, an LED light source located in said support means and being operative to provide light traveling inside said solid plastic member for illuminating said main body, said side branches and said secondary side branches.

* * * * *